United States Patent
Marek et al.

(10) Patent No.: US 12,299,130 B2
(45) Date of Patent: May 13, 2025

(54) METHOD FOR SECURE, EFFICIENT STARTUP OF HYPER-CONVERGED SYSTEMS USING HYBRID CENTRALIZATION

(71) Applicant: Rockwell Collins, Inc., Cedar Rapids, IA (US)

(72) Inventors: James A. Marek, Anamosa, IA (US); John D Martin, Richardson, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 172 days.

(21) Appl. No.: 18/098,446

(22) Filed: Jan. 18, 2023

(65) Prior Publication Data
US 2024/0241958 A1 Jul. 18, 2024

(51) Int. Cl.
*G06F 21/57* (2013.01)
*H04L 9/32* (2006.01)

(52) U.S. Cl.
CPC ............... *G06F 21/57* (2013.01); *H04L 9/32* (2013.01)

(58) Field of Classification Search
CPC .................................. G06F 21/57; H04L 9/32
See application file for complete search history.

(56) References Cited

U.S. PATENT DOCUMENTS

| | | |
|---|---|---|
| 6,727,920 B1 | 4/2004 | Vineyard, Jr. et al. |
| 7,275,153 B2 | 9/2007 | Kim |
| 8,429,390 B2 | 4/2013 | Yu et al. |
| 8,880,862 B2 | 11/2014 | Fallon et al. |
| 11,755,534 B2 * | 9/2023 | Hsu ........ G06F 18/214 707/822 |
| 11,782,727 B2 * | 10/2023 | Liang ........ G06F 9/4403 713/2 |
| 2004/0003103 A1 * | 1/2004 | Witt ........ G06F 11/1464 709/231 |
| 2004/0143696 A1 | 7/2004 | Hsieh |
| 2006/0026429 A1 | 2/2006 | Kudo et al. |
| 2008/0209198 A1 | 8/2008 | Majni et al. |

(Continued)

FOREIGN PATENT DOCUMENTS

CN 112733208 B 10/2021

OTHER PUBLICATIONS

European Patent Office, Extended European Search Report received in EP Application No. 23209831.9, May 10, 2024, 7 pages.

(Continued)

*Primary Examiner* — Tammara R Peyton
(74) *Attorney, Agent, or Firm* — Suiter Swantz IP

(57) ABSTRACT

A system for utilizing a boot prefetch module is disclosed, such as a hyperconverged system with centralized storage. The system may include a controller. The controller may include one or more processors configured to execute program instructions causing the one or more processors to perform a parallelized boot of a plurality of nodes. The performing of the parallelized boot may include retrieving node boot data associated with the respective node from centralized storage. The one or more boot prefetch modules may be configured to perform the retrieving of the node boot data prior to the respective node being booted. The one or more boot prefetch modules may be coordinated in retrieving the node boot data and be configured to perform decryption and/or signature verification.

16 Claims, 4 Drawing Sheets

(56) References Cited

U.S. PATENT DOCUMENTS

2010/0070800 A1  3/2010  Hanna
2021/0240833 A1  8/2021  Bae et al.
2022/0261255 A1  8/2022  Sharon et al.

OTHER PUBLICATIONS

INTEL: "Preboot Execution Environment (PXE) Specification Version 2.1", Internet Citation, Sep. 20, 1999, 103 pages.

* cited by examiner

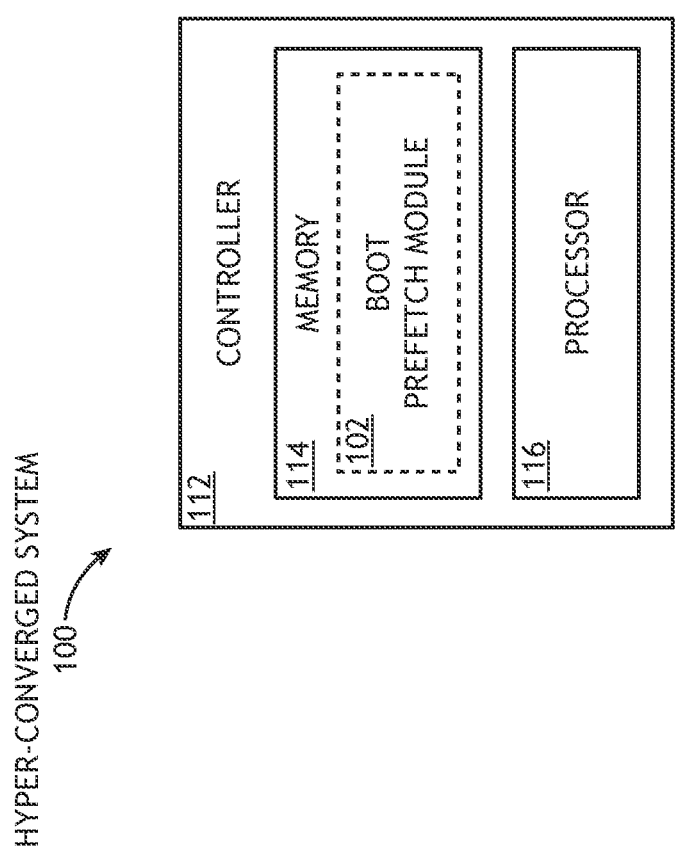

METHOD FOR SECURE, EFFICIENT STARTUP OF HYPER-CONVERGED SYSTEMS USING HYBRID CENTRALIZATION

TECHNICAL FIELD

The present disclosure relates generally to the field of distributed computing, and more particularly to a system and method for secure, efficient, high-speed startup of hyper-converged systems using hybrid centralization.

BACKGROUND

Hyper-converged systems are becoming increasingly popular, due to their ability to provide distributed computing inclusive of software defined networking (SDN) on a single platform. However, these systems often require secure, rapid startup from a centralized storage system. Currently, many systems rely on centralized storage which is often encrypted, and additionally require signed software to verify the integrity of the software prior to boot. Further, for sensitive software (e.g., classified, Critical Program Information (CPI), etc.), it is often required that the data at rest be encrypted with high assurance encryption. This can lead to delays and dependencies on each node in the system in order to achieve secure startup.

Therefore, there is a need for a system and method that can provide secure, efficient, high-speed startup of hyper-converged systems with centralized storage, while minimizing delays and dependencies on each node.

SUMMARY

A system for utilizing a boot prefetch module is disclosed in accordance with one or more illustrative embodiments of the present disclosure. In one illustrative embodiment, the system may include a controller. In another illustrative embodiment, the controller may include one or more processors configured to execute program instructions causing the one or more processors to perform a parallelized boot of a plurality of nodes. In another illustrative embodiment, the performing of the parallelized boot may include retrieving node boot data associated with the respective node from a centralized storage. In another illustrative embodiment, the one or more boot prefetch modules may be configured to perform the retrieving of the node boot data prior to the respective node being booted.

In another illustrative embodiment, the one or more boot prefetch modules may be coordinated in retrieving the node boot data and be configured to perform decryption and/or signature verification.

A method for utilizing a boot prefetch module configured for parallelized boot of a hyper-converged system is disclosed in accordance with one or more illustrative embodiments of the present disclosure. In one illustrative embodiment, the method may include providing one or more boot prefetch modules. In another illustrative embodiment, the method may include performing, via the one or more boot prefetch modules, a parallelized boot of a plurality of nodes. In another illustrative embodiment, the performing of the parallelized boot may include retrieving node boot data associated with the respective node from a centralized storage. In another illustrative embodiment, the one or more boot prefetch modules may be configured to perform the retrieving of the node boot data prior to the respective node being booted.

In another illustrative embodiment, the one or more boot prefetch modules may be coordinated in retrieving the node boot data and be configured to perform decryption and/or signature verification.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 1A is a conceptual block diagram of a boot prefetch module, in accordance with one or more embodiments of the present disclosure.

DETAILED DESCRIPTION

Figure 1B:
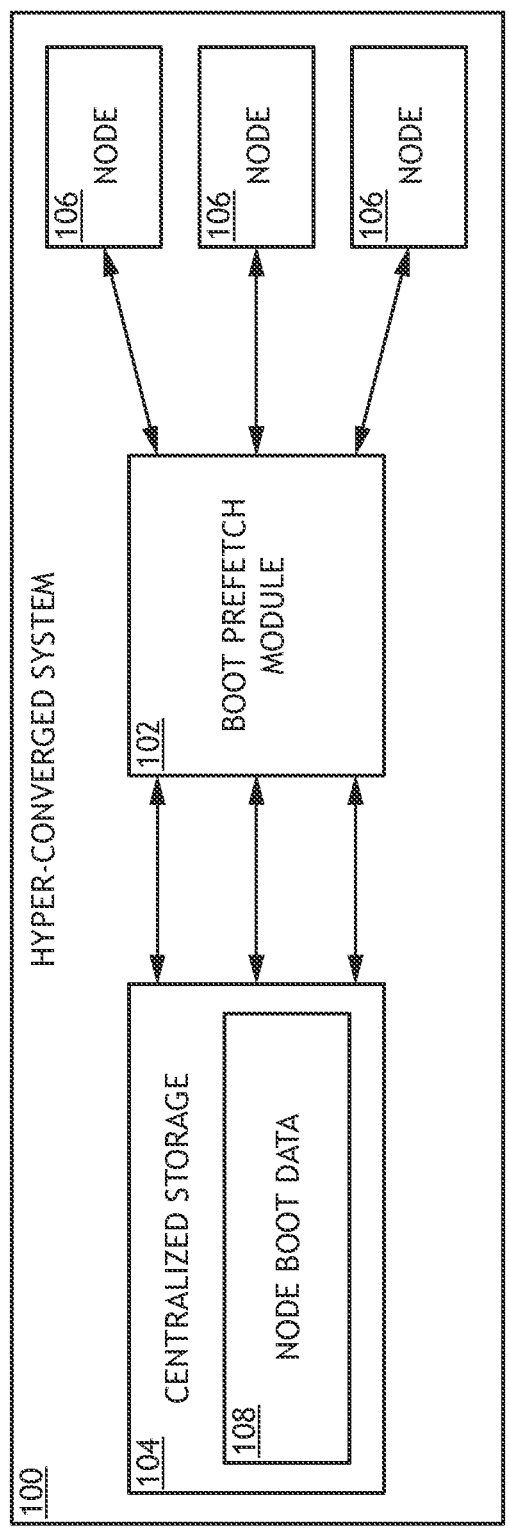
FIG. 1B is a conceptual block diagram of a boot prefetch module, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Centralized storage is generally more flexible and efficient (e.g., doesn't require multiple copies of the same data in multiple storage locations) than other storage schemes but includes additional challenges.

With centralized storage, there is a desire to ensure that nodes receive the correct data (e.g., software data, configuration data, etc.) according to each node's requirements and configuration. However, one challenge is that nodes are often the last things to power up (e.g., booting) in a system. Further, they are often trying to simultaneously boot while performing verification of image signatures and optionally decryption of the software data.

It is contemplated herein that using a boot prefetch module configured to fetch data relatively early in system power up time may provide benefits to a booting of a system. For example, the boot prefetch module can begin retrieving software data and configuration data from the centralized storage as soon as it is available. Further, the boot prefetch module may offload tasks from the nodes such as verification and decryption so that the nodes may, in some embodiments, only need to perform tasks such as loading the data and booting, thereby reducing a workload of the nodes.

It is further contemplated, in some embodiments, that the data (i.e., node boot data) may be broken into smaller portions (e.g., blocks) that are individually signed and/or encrypted so that, in some respects, a pipeline may be formed between the centralized storage and the nodes. The boot prefetch module (or multiple boot prefetch modules) may use such a pipeline to fetch/retrieve the blocks, verify the blocks, and optionally decrypt the blocks to be ready for each node before the nodes initiate a boot process (i.e., power up). For example, such a pipeline may be used before and/or during a node performing a first stage booting. For purposes of the present disclosure, a "first stage booting" of a node generally does not involve a node retrieving data from centralized storage. Rather, a first stage booting defines the type of boot processes that may be performed without data from centralized storage, such as with data localized with the node. In this regard, data retrieved from centralized storage may be obtained in parallel to a first stage booting of a node and ready for the node in time, without delaying a boot process of the node or requiring the node to perform additional verification or decryption. This allows the node to be powered up faster than if the node had to wait for software data to be fetched.

Additionally, some embodiments may utilize a first encryption (and first verification) of the node boot data as it is stored on the centralized storage such as encryption of the entire amount of node boot data needed by a particular node—or, if stored as blocks, first encryption/verification of each individual block. Such a first encryption and first verification may be decrypted and verified, respectfully, by the boot prefetch module.

As added protection, and explained in further embodiments in the present disclosure, an optional second encryption and/or second verification may be used by the boot prefetch module. For example, the node boot data may be stored on the centralized storage using NSA Type 1 encryption and the boot prefetch module may be configured to apply Federal Information Processing Standard (FIPS) encryption when retrieving the node boot data as an added layer of security. For example, the boot prefetch module may apply such a second encryption and/or verification layer to the node boot data itself, and/or perform a second decryption and second verification at a secure point in time of the retrieval process, such as immediately before and/or after loading the node boot data to a location localized to the node. Alternatively, the node boot data may remain secured by the second encryption until the node needs the node boot data for the boot process.

Note that certifying storage solutions for encryption illustrates an advantage of centralized storage and the present disclosure. Generally, certifying each storage location for encryption such as NSA Type 1 encryption may be expensive. However, a centralized storage may only need to be certified once, reducing costs compared to certifying many distributed storage locations. In this regard, a boot prefetch module may leverage the advantages of secondary encryption techniques to provide a relatively cost-effective and improved secure solution for fast boot up of systems.

Further, as an additional challenge, if each node stores all of its node boot data on the centralized storage, then random data transfer requests of the centralized storage as all nodes attempt to boot will cause degradation of the performance and ability of the centralized storage to service all requests. By coordinating data requests using a single boot prefetch module (or coordinating between multiple boot prefetch modules), then data requests may be optimized (e.g., relatively optimized) for maximizing the streaming of data.

The benefits of a boot prefetch module are numerous. As noted, it is contemplated that a hybrid approach using a boot prefetch module, may overcome at least some of the challenges above. For example, in at least some embodiments, the node boot data may include a first portion (i.e., first block) of an amount of data needed for a particular node to boot and/or perform some functionality of a set of functionalities, and the remaining portion of data may be retrieved at a different time. In this way, the first portion may be retrieved early in the boot process in an efficient, orchestrated way to expedite the boot process and/or functionality attainment of nodes. For instance, it is contemplated that loading a first portion of data (i.e., a block of node boot data) initially, may allow each node to start a boot process. As explained in other descriptions of this disclosure, a multi-stage boot process based on dependencies and the like may also be used to boot some nodes before others.

Broadly speaking, embodiments of the inventive concepts disclosed herein are directed to a system and method for secure, efficient, high-speed startup of hyper-converged systems using hybrid centralization. In one or more embodiments, a boot prefetch module (e.g., a "smart" boot/startup prefetch engine) is included. In embodiments, the boot prefetch module includes decryption and/or signature verification capabilities. In embodiments, the boot prefetch module can coordinate with other boot prefetch engines either directly and/or indirectly. This may enable a system to boot from a centralized storage while ensuring security. The boot prefetch module may be preprogrammed to know the order of execution and dependencies of nodes to further enhance the prefetching performance. Further, the boot prefetch module may be configured to utilize a second layer of encryption to further protect sensitive software nodes. This approach provides a flexible context to rapidly boot/startup distributed compute systems while maintaining security requirements.

"Hybrid centralization" generally refers to a system that combines centralized and distributed components. In the context of hyper-converged systems, hybrid centralization refers to a system that utilizes a centralized storage system for booting, while also utilizing distributed compute nodes for executing the software. This approach provides the benefits of both centralized and distributed systems, such as increased security, faster startup, and more efficient resource utilization. Hybrid centralization also allows for more flexibility in terms of scaling and customization, as the system can be tailored to the specific needs of the user.

As used in the present disclosure, "boot", "startup", "power up", and the like are generally interchangeable.

"Converged" generally refers to a hardware-based approach to converging storage and processes. This approach typically provides a platform for repeatable, modular deployment of datacenter resources for rapid scale and more consistent performance. Converged infrastructure is generally more expensive and less efficient than hyperconverged infrastructure.

"Hyperconverged" generally refers to a distributed computing system that combines server, networking, and storage resources into a single platform. This platform is typically managed by intelligent software, which allows for the creation of flexible building blocks that replace legacy infrastructure, reducing compatibility issues, complex deployments, and overall costs. Hyperconverged infrastructure is generally a more efficient and cost-effective alternative to traditional converged infrastructure, which is a hardware-based approach to converging storage and processes.

"Module" generally refers to a self-contained component of a larger system. In the context of software, a module is a piece of code that performs a specific task or set of tasks. Modules can be used to create a larger system by combining multiple modules together and can be written in a variety of programming languages, such as C, C++, Java, Python, and JavaScript. Modules provide a more efficient and cost-effective system by reducing the amount of code that needs to be maintained. Modules may provide a more secure system by isolating code into separate modules, which can be tested and verified independently.

"Centralized storage" generally refers to a storage system that is located in a single physical location (e.g., server building, etc.). This type of storage system is typically used to store data that is accessed by multiple users or systems. Centralized storage systems are typically more secure and efficient than distributed storage systems, as they are easier to manage and maintain. Centralized storage systems can be implemented using a variety of technologies, such as hard disk drives, solid-state drives, tape drives, optical drives, and cloud storage. Centralized storage systems generally store a variety of data, such as documents, images, videos, and audio files as well as data for a variety of applications, such as web applications, databases, and virtual machines.

"Node" generally refers to a single point in a network or system that can send and receive data. Nodes can create a distributed system, where multiple nodes are connected and communicate. Nodes can also be used to create a distributed computing system, where tasks are distributed across multiple nodes or a distributed application, where an application is distributed across multiple nodes. In the context of virtualized nodes, a node is a virtual machine or other virtualized computing resource hosted on a physical server or other hardware. Virtual nodes can create a distributed system, storage system, computing system, or application, as described above.

"Node boot data" generally refers to the data required for a node to boot or start up. This data includes instructions and configuration settings to initialize the node and configure it for operation, such as network settings, storage settings, and application settings. It also includes software, such as operating systems, applications, and drivers, and data to access other nodes or systems, such as credentials, certificates, security settings, and authentication information. Additionally, it includes data to access data stores, such as databases, files, and other storage systems.

"Protocols" generally refer to a set of rules and standards that govern the exchange of data between two or more systems. Protocols can ensure data is transmitted and received consistently and reliably. Common protocols used for data retrieval include File Transfer Protocol (FTP), Hypertext Transfer Protocol (HTTP), and Secure File Transfer Protocol (SFTP). Relatively secure protocols include Transport Layer Security (TLS) and Secure Sockets Layer (SSL). Relatively efficient protocols include Quality of Service (QoS) and Quality of Experience (QoE). Generally, protocols may utilize error correction, retransmission, checksums, and/or digital signatures to improve accuracy and reliability.

FIG. 1A illustrates a conceptual block diagram of a boot prefetch module 102, in accordance with one or more embodiments of the present disclosure.

In embodiments, the system 100 is a hyper-converged system. The system 100 may include a controller 112. The processors 116 may be configured to execute program instructions (e.g., software) causing the one or more processors 116 to perform steps and the like of the present disclosure.

FIG. 1B illustrates a conceptual block diagram of a boot prefetch module 102, in accordance with one or more embodiments of the present disclosure. As shown, the boot prefetch module 102 is configured to coordinate with a centralized storage 104 and a plurality of nodes 106. In embodiments, the boot prefetch module 102 is configured to retrieve node boot data 108 from the centralized storage 104. The node boot data 108 may be used to preload software prior to the local compute node 106 being ready to execute the software. In embodiments, the boot prefetch module 102 is configured to detect resource contention on the centralized storage 104 and to back off and retry when collisions occur. Further, the boot prefetch module 102 may be configured to prefetch the node boot data 108 with high assurance encryption.

Figure 1C:
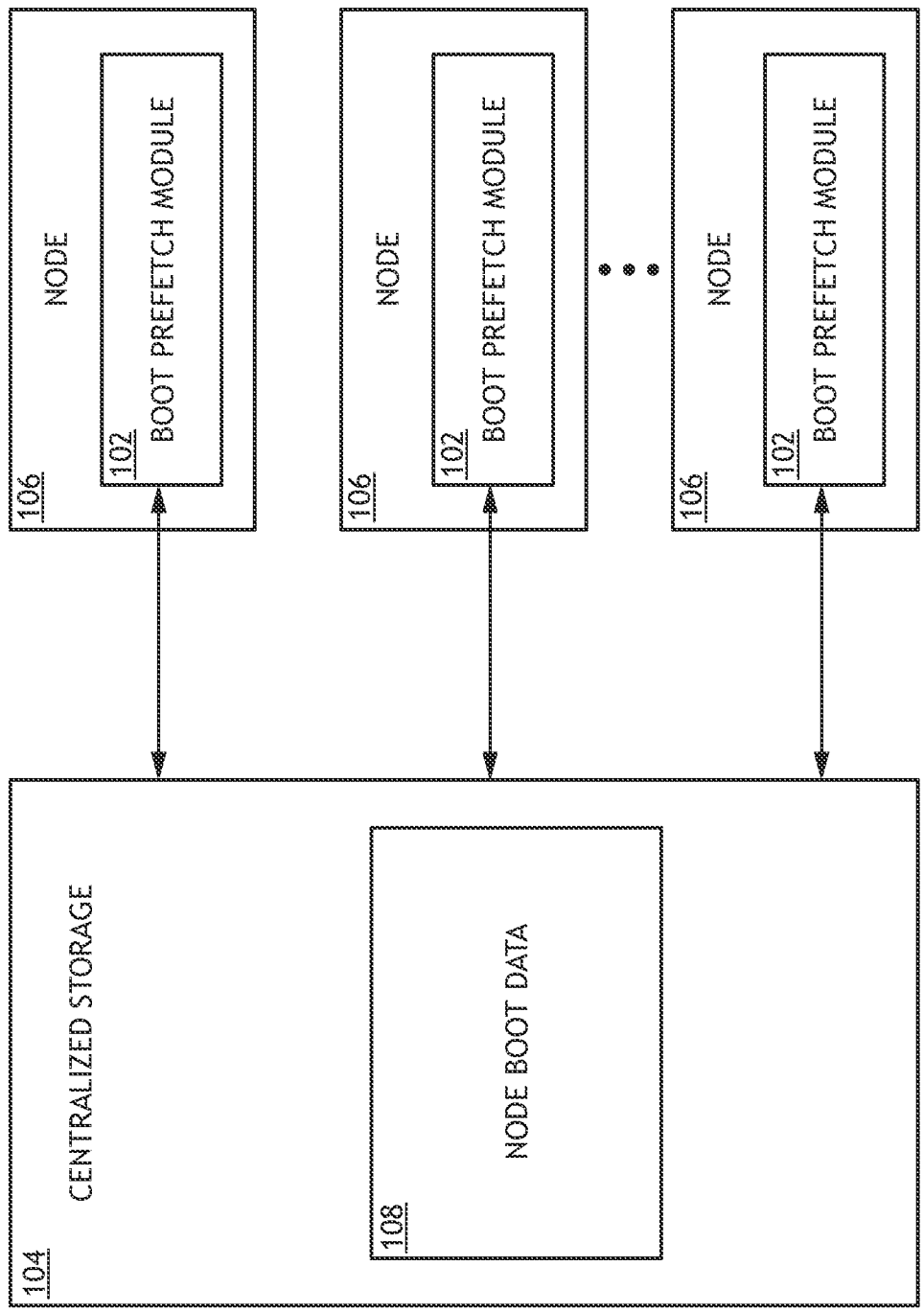
FIG. 1C is a conceptual block diagram of a set of boot prefetch modules associated with a set of nodes, in accordance with one or more embodiments of the present disclosure.

FIG. 1C is a conceptual block diagram of a set of boot prefetch modules 102 associated with a set of nodes 106, in accordance with one or more embodiments of the present disclosure. As noted previously, more than one boot prefetch module 102 may be utilized. For example, each node 106 may, but is not necessarily required to, be associated with its own boot prefetch module 102 (or multiple boot prefetch modules 102). In this regard, each boot prefetch module 102 proxies for one or more nodes 106.

With more than one boot prefetch module 102 for the entire system, coordinating the boot prefetch modules 102 would likely be optimal. However, coordinating the boot prefetch modules 102 is not necessarily required to achieve at least some of the benefits of multi-boot prefetch module systems.

The boot prefetch modules 102 may be coordinated, either directly or indirectly. For example, the boot prefetch modules 102 may be indirectly coordinated via prior knowledge of boot sequence of nodes 106 that is based on prior recorded history of the node 106 boot sequence. For instance, the boot prefetch modules 102 may be configured to retrieve node boot data 108 at certain time steps based on the prior knowledge such that the boot prefetch modules 102 are essentially coordinated and optimized in the retrieval of data, without necessarily needed to directly communicate with each other. By way of another example, in a more direct way, the boot prefetch modules 102 may be configured to communicate with each other to coordinate (e.g., plan, sequence, etc.) when and which boot prefetch modules 102 will retrieve node boot data 108 for which nodes 106. For example, a change in the system (e.g., change in functionality, purpose, configuration data, or the like) may cause a change in the dependencies, order of execution, security requirements and/or the like of the nodes 106. In a coordinated configuration, the boot prefetch modules 102 may be configured to determine which nodes 106 should be prioritized based on such a change. For instance, the configuration data may indicate which type of function/application is to be run, and the function (e.g., finite element analysis (FEA)) may be associated with certain nodes requiring relatively more data than others. In such a scenario, the boot prefetch modules 102 may determine this collectively, or through some centralized process, and communicate such information to each other directly (or the like) so that each boot prefetch module 102 is configured to some degree to prioritize the booting of which nodes 106 or types of nodes. Consequently, for example, some unassociated boot prefetch modules 102 may wait to retrieve from the centralized storage 104 based on, for example, a change in dependencies. For such a direct communication and coordination, at least a portion of the boot prefetch modules 102 may be configured to communicate with each other using any protocol known in the art.

Figure 2:
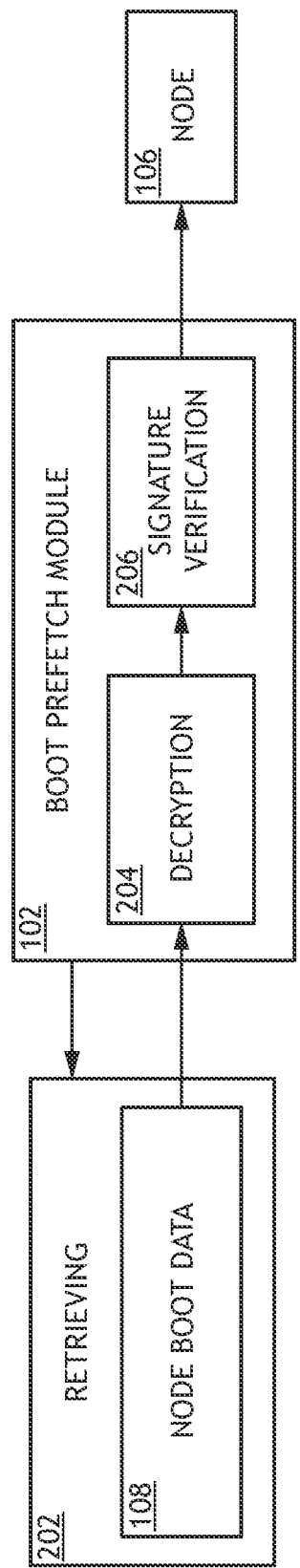
FIG. 2 is a flow diagram illustrating steps performed in a method for a parallelized boot using a boot prefetch module, in accordance with one or more embodiments of the present disclosure

FIG. 2 is a flow diagram illustrating steps performed in a method for a parallelized boot using a boot prefetch module 102, in accordance with one or more embodiments of the present disclosure. As shown, the method begins at step 200.

At step 202, the boot prefetch module 102 is configured to retrieve node boot data 108 associated with each respective node 106 of the plurality of nodes 106 from the centralized storage 104. In embodiments, the node boot data 108 is encrypted with a layer of encryption such as Commercial Solutions for Classified (CsFC) encryption, NSA-approved cryptography, or FIPS encryption. At least one definition of NSA-approved cryptography is cryptography that consists of an approved algorithm, an implementation that has been approved for the protection of classified information and/or controlled unclassified information in a specific environment, and a supporting key management infrastructure (as defined in, e.g., NIST Special Publication 800-53 Rev. 5, generally available at doi.org/10.6028/NIST.SP.800-53r5).

In embodiments, the retrieving of the node boot data 108 of each respective node 106 is based on an order of execution of the plurality of nodes 106. This order of execution may be based on the order in which the nodes are to be booted, such as the order in which the nodes are to be powered on or the order in which the nodes are to be connected to the network. For example, the order of execution may be based on the order in which the nodes are to be used, such as the order in which the nodes are to be used to process data or the order in which the nodes are to be used to access a shared resource. For instance, the order the nodes 106 are to be used may be based on prior history of the order the nodes 106 as used in previous recorded boot processes. For example, the order of the retrieving of the node boot data 108 may be equal to such an order of nodes 106 based on the prior history.

In embodiments, the retrieving of the node boot data 108 of each respective node 106 is based on dependencies of the plurality of nodes 106. This may include dependencies between the nodes, such as the order in which the nodes must be booted in order for the system to function properly. For example, a node 106 may need to be booted before another node in order for the system to function properly. In another example, a node 106 may need to be booted before another node 106 in order for the node 106 to access a shared resource. For instance, the dependencies between the nodes 106 may be based on the order in which the nodes 106 must be booted in order for the system to function properly. Further, the node boot data 108 for the node 106 that must be booted first may be retrieved first based on the dependencies.

In embodiments, the retrieving of the node boot data 108 of each respective node 106 is based on security requirements of the plurality of nodes 106. This may include requirements for encryption, authentication, and/or access control. For example, a node 106 may need to be booted with encryption enabled in order to access a secure resource. In another example, a node 106 may need to be booted with authentication enabled in order to access a shared resource. In yet another example, a node 106 may need to be booted with access control enabled in order to access a restricted resource. For instance, the security requirements may be based on the encryption, authentication, and/or access control needed for the node to access a secure resource and the node boot data 108 for the node that requires the security requirements first may be retrieved first based on the security requirements.

In embodiments, the boot prefetch module 102 is configured to perform the retrieving of the node boot data 108 prior to the respective node 106 being booted. In this regard, the node boot data 108 may be readily available, improving the speed and efficiency of the overall boot process.

In embodiments, the retrieving of the node boot data 108 may be performed using any method or protocol known in the art. In embodiments, the retrieving the node boot data includes retrieving the node boot data using a File Transfer Protocol (FTP). FTP is a standard network protocol used to transfer files between computers on a network. FTP is typically used to securely transfer files between a client and a server, and can be used to transfer files of any size. FTP is also typically used to transfer files between two computers on the same network, or between two computers on different networks. FTP is a reliable and secure protocol, and is often used to transfer sensitive data, such as node boot data. In embodiments, the FTP is configured to securely transfer the node boot data. For example, the FTP may be configured to use encryption, authentication, and/or other security measures to ensure the node boot data is securely transferred.

In embodiments, the retrieving of the node boot data 108 may be based on a key management hierarchy. A key management hierarchy is a system of key management that is used to securely store and manage encryption keys. Key management hierarchies typically include multiple levels of encryption keys, with each level providing a different level of security. For example, a key management hierarchy may include a master key, which is used to encrypt and decrypt data, and a set of sub-keys, which are used to encrypt and decrypt data at a lower level. Key management hierarchies can be used to securely store and manage encryption keys for a variety of applications, such as node boot data. In embodiments, the key management hierarchy is configured to securely store and manage encryption keys. For example, the key management hierarchy may be configured to use encryption, authentication, and/or other security measures to ensure the encryption keys are securely stored and managed.

In embodiments, the boot prefetch module 102 is configured to detect resource contention on the centralized storage 104 and to back off and retry when collisions occur. This may be accomplished by using techniques such as exponential backoff or random backoff.

In embodiments, the boot prefetch module 102 is configured to retrieve the node boot data 108 with a second encryption (e.g., high-assurance encryption, FIPS, and the like). For example, the node boot data 108 may be encrypted on the centralized storage using NSA Type 1 encryption and the boot prefetch module 102 may apply a second encryption such as FIPS during the retrieving of the node boot data 108. This may be accomplished by using encryption techniques known in the art such as, but not limited to, symmetric key encryption, asymmetric key encryption, and/or public key encryption. For instance, this may be accomplished by using encryption techniques such as Advanced Encryption Standard (AES), Rivest-Shamir-Adleman (RSA), and/or Elliptic Curve Cryptography (ECC).

In embodiments, the node boot data 108 may be encrypted with quantum resistance encryption. Quantum resistance encryption is a type of encryption that is designed to protect data from quantum computing attacks. Quantum computing attacks are attacks that use quantum computers to break traditional encryption algorithms.

At step 204, the boot prefetch module 102 is configured to decrypt the node boot data 108. For example, decryption techniques known in the art may be used such as, but not limited to, symmetric key encryption, asymmetric key encryption, and/or public key encryption.

Decryption may include removing encryption of the node boot data 108 that existed when stored on the centralized storage and/or removing encryption such as an additional layer of encryption applied during the retrieval of the node boot data 108.

At step 206, the boot prefetch module 102 is configured to verify a signature of the node boot data 108. Verifying a signature generally refers to a process of authenticating a digital signature. This process typically involves using cryptographic algorithms to compare a digital signature to a message or data to ensure that the signature is valid and that the message or data has not been altered. Signature verification techniques known in the art may be used such as, but not limited to, digital signature algorithms, hash functions, and/or message authentication codes. For example, a digital signature algorithm may be used to generate a signature from a message or data, and then the signature may be verified by comparing it to the original message or data. Similarly, a hash function may be used to generate a hash of a message or data, and then the hash may be verified by comparing it to the original message or data. Additionally, a message authentication code may be used to generate a code from a message or data, and then the code may be verified by comparing it to the original message or data.

In embodiments, the boot prefetch module 102 is flexibly configured to support zero trust and integrity. This may be accomplished using a secure boot process, such as a Trusted Platform Module (TPM), a Trusted Execution Environment (TEE), and/or any secure bootloader known in the art. The secure bootloader may confirm the integrity of the boot process and ensure that the system is not compromised.

In embodiments, the node boot data 108 is used to preload software prior to the local compute node 106 being ready to execute the software. For example, a pre-boot execution environment (PXE) or a network boot protocol may be used.

The one or more processors 116 of controller 112 may include any one or more processing elements known in the art. In this sense, the one or more processors 116 may include any microprocessor device configured to execute algorithms and/or instructions. In one embodiment, the one or more processors 116 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory 114). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory medium 114 may include any storage medium known in the art suitable for storing program instructions executable by the associated one or more processors 116. For example, the memory medium 114 may include a non-transitory memory medium. For instance, the memory medium 114 may include, but is not limited to, a read-only memory, a random access memory, a magnetic or optical memory device (e.g., disk), a magnetic tape, a solid state drive and the like. In another embodiment, it is noted herein that the memory 114 is configured to store one or more results from the system 100 and/or the output of the various steps described herein. It is further noted that memory 114 may be housed in a common controller housing with the one or more processors 116. In an alternative embodiment, the memory 114 may be located remotely with respect to the physical location of the processors and controller 112. For instance, the one or more processors 116 of controller 112 may access a remote memory (e.g., server), accessible through a network (e.g., internet, intranet and the like). In another embodiment, the memory medium 114 stores the program instructions for causing the one or more processors 116 to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

In another embodiment, the controller 112 of the system 100 may be configured to receive and/or acquire data or information from other systems by a transmission medium that may include wireline and/or wireless portions. In another embodiment, the controller 112 of the system 100 may be configured to transmit data or information (e.g., the output of one or more processes disclosed herein) to one or more systems or subsystems by a transmission medium that may include wireline and/or wireless portions. In this manner, the transmission medium may serve as a data link between the controller 112 and other subsystems of the system 100. Moreover, the controller 112 may send data to external systems via a transmission medium (e.g., network connection).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments, "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method for utilizing a boot prefetch module configured for parallelized boot of a hyper-converged system, the method comprising:
   providing one or more boot prefetch modules; and
   performing, via the one or more boot prefetch modules, a parallelized boot of a plurality of nodes, wherein the performing of the parallelized boot, for each respective node of at least some of the plurality of nodes, comprises:
      retrieving node boot data associated with the respective node from a centralized storage, wherein the one or more boot prefetch modules is configured to perform the retrieving of the node boot data prior to the respective node being booted, and wherein the retrieving the node boot data is performed in parallel to a first stage booting of the respective node, wherein the first stage booting is performed without data from the centralized storage and with data localized with the respective node,
      wherein the retrieving the node boot data of each respective node is based on dependencies, an order of execution, and security requirements of the plurality of nodes,
   wherein the one or more boot prefetch modules is configured to perform decryption and signature verification of the node boot data prior to the respective node being booted.

2. The method of claim 1, wherein the performing the parallelized boot further comprises decrypting, via the one or more boot prefetch modules, the node boot data.

3. The method of claim 1, wherein the performing the parallelized boot further comprises verifying, via the one or more boot prefetch modules, a signature of the node boot data.

4. The method of claim 1, wherein the retrieving the node boot data of each respective node comprises retrieving a block, wherein the block includes only a portion of data needed to perform a respective boot of a node.

5. The method of claim 1, wherein the one or more boot prefetch modules are configured to apply a second encryption to the node boot data during the retrieving of the node boot data.

6. The method of claim 1, wherein each of the one or more boot prefetch modules is configured to coordinate with other boot prefetch modules of the one or more boot prefetch modules.

7. The method of claim 1, wherein the node boot data is encrypted with at least one of Commercial Solutions for Classified (CsFC) encryption, NSA-approved cryptography, or Federal Information Processing Standard (FIPS) encryption.

8. The method of claim 1, wherein the one or more boot prefetch modules is configured to detect resource contention on the centralized storage and to back off and retry when collisions occur.

9. A system for utilizing a boot prefetch module configured for parallelized boot of a hyper-converged system, the system comprising:
   a controller, the controller comprising one or more processors configured to execute program instructions causing the one or more processors to:
      perform, via one or more boot prefetch modules, a parallelized boot of a plurality of nodes,
      wherein the performing of the parallelized boot, for each respective node of at least some of the plurality of nodes, comprises:
         retrieving node boot data associated with the respective node from a centralized storage, wherein the one or more boot prefetch modules is configured to perform the retrieving of the node boot data prior to the respective node being booted, and wherein the retrieving the node boot data is performed in parallel to a first stage booting of the respective node, wherein the first stage booting is performed without data from the centralized storage and with data localized with the respective node,
         wherein the retrieving the node boot data of each respective node is based on dependencies, an order of execution, and security requirements of the plurality of nodes,
   wherein the one or more boot prefetch modules is configured to perform decryption and signature verification of the node boot data prior to the respective node being booted.

10. The system of claim 9, wherein the program instructions are further configured to cause the one or more processors to: decrypt, via the one or more boot prefetch modules, the node boot data.

11. The system of claim 9, wherein the program instructions are further configured to cause the one or more processors to: verify, via the one or more boot prefetch modules, a signature of the node boot data.

12. The system of claim 9, wherein the retrieving the node boot data of each respective node comprises retrieving a block, wherein the block includes only a portion of data needed to perform a respective boot of a node.

13. The system of claim 9, wherein the one or more boot prefetch modules are configured to apply a second encryption to the node boot data during the retrieving of the node boot data.

14. The system of claim 9, wherein each of the one or more boot prefetch modules is configured to coordinate with other boot prefetch modules of the one or more boot prefetch modules.

15. The system of claim 9, wherein the node boot data is encrypted with at least one of Commercial Solutions for Classified (CsFC) encryption, NSA-approved cryptography, or Federal Information Processing Standard (FIPS) encryption.

16. The system of claim 9, wherein the one or more boot prefetch modules is configured to detect resource contention on the centralized storage and to back off and retry when collisions occur.

* * * * *